US009070057B2

(12) United States Patent
Hamilton et al.

(10) Patent No.: US 9,070,057 B2
(45) Date of Patent: Jun. 30, 2015

(54) METHOD AND SYSTEM FOR IDENTIFICATION OF ASSETS

(71) Applicant: General Electric Company, Schenectady, NY (US)

(72) Inventors: Donald Wagner Hamilton, Burnt Hills, NY (US); Peter Henry Tu, Niskayuna, NY (US); Ting Yu, Niskayuna, NY (US); Yi Yao, Avenel, NJ (US); Dashan Gao, San Diego, CA (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 13/663,955

(22) Filed: Oct. 30, 2012

(65) Prior Publication Data

US 2014/0117077 A1     May 1, 2014

(51) Int. Cl.
| | |
|---|---|
| *G06F 17/00* | (2006.01) |
| *G06K 19/06* | (2006.01) |
| *G07C 9/00* | (2006.01) |
| *G06K 7/14* | (2006.01) |
| *G03B 7/00* | (2014.01) |
| *B42D 25/382* | (2014.01) |

(52) U.S. Cl.
CPC ...... *G06K 19/06028* (2013.01); *G07C 9/00079* (2013.01); *G07C 9/00007* (2013.01); *B42D 25/382* (2014.10); *G06K 19/06046* (2013.01); *G06K 7/1417* (2013.01); *G03B 7/00* (2013.01)

(58) Field of Classification Search
CPC ... H04N 5/235; H04N 5/372; G06K 19/6009; G06K 19/14; G06K 19/06028; G06K 19/06046; G06K 7/1417; G08B 13/19608; G08B 21/0446; G08B 21/22; G03B 7/00; B42D 25/382; G07C 9/00079; G07C 9/00007

USPC ........... 235/382; 369/1; 256/621; 700/12; 250/226; 359/351; 340/573.1
See application file for complete search history.

(56) References Cited

U.S. PATENT DOCUMENTS

| | | | | |
|---|---|---|---|---|
| 4,557,572 | A  * | 12/1985 | Schickedanz | 396/374 |
| 5,200,851 | A  * | 4/1993  | Coderre et al. | 359/351 |
| 6,446,865 | B1 * | 9/2002  | Holt et al. | 235/382 |
| 6,507,441 | B1   | 1/2003  | Eisenberg et al. | |
| 7,242,306 | B2 * | 7/2007  | Wildman et al. | 340/573.1 |
| 7,314,181 | B2   | 1/2008  | Lapstun et al. | |

(Continued)

OTHER PUBLICATIONS

Srinivasan et al, "Employee Monitoring & HR Management Using RFID," Electronics, Communication and Computing Technologies (ICECCT), 2011 International Conference, Sep. 12-13, 2011, pp. 53-58.

(Continued)

*Primary Examiner* — Christopher Stanford
*Assistant Examiner* — Asifa Habib
(74) *Attorney, Agent, or Firm* — Scott J. Asmus (57) ABSTRACT

A method for identifying assets is provided. The method includes illuminating an identification pattern associated with the asset with non-visible light. The identification pattern includes retroreflective material that represents identity information of the asset. The method further includes adjusting either a shutter speed of an image sensor, or a power of the non-visible light, or both, based on motion state of the asset. The image sensor is configured to receive response of the retroreflective material to the non-visible light. Furthermore, the method includes the step of identifying the asset based on decoded identity information. The decoded identity information is obtained by processing the response of the retroreflective material.

21 Claims, 3 Drawing Sheets

(56) References Cited

U.S. PATENT DOCUMENTS

| | | |
|---|---|---|
| 7,387,393 B2 | 6/2008 | Reich et al. |
| 7,463,150 B2 | 12/2008 | Rajan |
| 7,715,590 B2 * | 5/2010 | Whitaker ................ 382/103 |
| 7,874,490 B2 | 1/2011 | Thomas, III |
| 8,113,434 B2 | 2/2012 | Thomas, III |
| 2002/0134835 A1 * | 9/2002 | Kennedy ................ 235/384 |
| 2005/0108912 A1 | 5/2005 | Bekker |
| 2005/0152229 A1 * | 7/2005 | Ito et al. ................ 369/1 |
| 2007/0086626 A1 | 4/2007 | Mariani et al. |
| 2007/0115125 A1 | 5/2007 | Lyon et al. |
| 2008/0048102 A1 * | 2/2008 | Kurtz et al. ................ 250/226 |
| 2011/0116105 A1 * | 5/2011 | Zhu et al. ................ 356/621 |
| 2013/0096697 A1 * | 4/2013 | Frazer et al. ................ 700/12 |

\* cited by examiner

METHOD AND SYSTEM FOR IDENTIFICATION OF ASSETS

BACKGROUND

Embodiments of the present disclosure relate generally to the field of identification of assets, and specifically, to a method and system utilizing retroreflective tags for asset identification.

Organizations all over the world own a large amount of assets that may include machines, devices and articles that are used in the organization, raw material required for manufacturing articles, and articles of manufacture that are sold at retail counters. In addition, a large number of human assets are employed to manage this inventory. For example, hospitals have a number of instruments such as X-ray machines, ultrasound scanners, medical ventilators, and medical monitors. In addition, hospitals also employ doctors, paramedical staff, and care-takers. Most organizations, owing to the costs incurred in purchasing and efficiently managing such assets want to track the assets. In addition, organizations also need to manage facility operations and restrict access to their facilities and allow only a certain set of individuals access to areas within these facilities. Further, it is also important for organizations to keep track of every item from their inventory to avoid losses due to misplacement of assets. Thus, it is important for organizations to identify physical and human assets.

One of the most common techniques of tracking and managing human assets is scanning or swiping a bar or magnetic code. However, this method requires the individuals to be cooperative and scan the user tags having the bar or magnetic codes. Also, the human assets are required to physically handle the cards/tags to get recognized. In cases such as hospitals, where the individuals are required to maintain high standards of physical hygiene, it thus becomes unadvisable that the individuals to handle tags/cards before they come in contact with patients.

To avoid physical contact with cards/tags, some organizations associate a Radio Frequency Identification (RFID) tags with physical and human assets. RFID tags are small and do not generally require a power source. In operation, the RFID tags transmit signals to a receiver located in proximity to the RFID tag and allows for identification. However, RFID tags typically cannot pinpoint the exact location of the asset; they merely establish the presence of the RFID tag in the field of sensitivity of the receiver. For example, an RFID tag meant to be associated with an asset may be misplaced in an area of sensitivity of a particular receiver. The receiver in such cases will always establish the presence of the assets although the assets may be at some distance from the receiver. Additionally, RFID tags are direction insensitive, and do not perform well when they are blocked from the transmitter through an obstruction or due to interference from electronic machinery.

Biometric recognition systems address the issue of identification of individuals near the recognition systems. These systems identify humans through the use of distinct features associated with one's face, fingerprints, iris, and/or voice. These systems, however, cannot be used to recognize inanimate assets such as machines and electronic devices. Further, for a large organization, installation of biometric recognition systems tends to be expensive and time consuming.

Hence, there is a need for a method and system that utilizes existing infrastructure at organizations to identify physical and human assets in a non-intrusive manner.

BRIEF DESCRIPTION

In one embodiment, a method for identifying assets is provided. The method includes illuminating an identification pattern associated with the asset with non-visible light. The identification pattern includes retroreflective material that represents identity information of the asset. The method further includes adjusting either a shutter speed of an image sensor, or a power of the non-visible light, or both, based on motion state of the asset. The image sensor is configured to receive response of the retroreflective material to the non-visible light. Furthermore, the method includes identifying the asset based on decoded identity information. The decoded identity information is obtained by processing the response of the retroreflective material.

In another embodiment, a system for identifying assets is provided. The system includes an identification pattern associated with the asset that includes retroreflective material. The identification pattern encodes identity information of the asset. The system also includes a light source disposed to illuminate the retroreflective material with non-visible light. Further, the system includes an image sensor disposed to receive a response of the identification pattern to the incident non-visible light. Furthermore, the system includes at least one processor that is configured to adjust a shutter speed of the image sensor, a power supplied to the light source, or both, based on motion state of the asset. The processor is also configured to process the response received from the retroreflective material to decode the identity information of the asset.

In yet another embodiment, a system for identifying at least one asset of a hospital is provided. The system includes an identification pattern associated with the at least one asset. The identification pattern includes retroreflective material that encodes identity information of the at least one asset. The system also includes a light source for illuminating the identification pattern for the asset with the non-visible light. The system further includes an image sensor, that receives responses from the retroreflective material to the incident non-visible light. The system further includes, a processor that is configured to generate control commands to control a shutter speed of the image sensor, or a power supplied to the light source, or both, based on a motion state of the at least one asset. The processor is also configured to process the response received from the identification pattern to decode the identity information for the at least one asset.

DRAWINGS

The present invention will be better understood from reading the following description of non-limiting embodiments, with reference to the attached drawings, wherein below.

DETAILED DESCRIPTION

Reference will be made herein to exemplary embodiments of the invention, examples of which are illustrated in the accompanying drawings. Wherever possible, the same reference numerals used throughout the drawings refer to the same or like parts.

Embodiments described herein relate to a method and system of identifying assets. Organizations, for example hospitals or offices, employ a large number of human resources and also keep a stock of a large number of physical assets to run their daily operations. The human resources employed by the organization and the physical assets utilized by the organization are termed "assets" of the organization. Each organization requires identification of the assets, primarily to keep track of their location within the organization's premises. The method for identifying assets, which will be described in greater detail in the following paragraphs, includes illuminating an identification pattern for the asset with non-visible light. The illumination pattern is associated with each asset and it includes retroreflective material. The non-visible light incident on the illumination pattern is generated by a light source that is located at different points in the organization premises. Further, in the method, a shutter speed of an image sensor and/or a power provided to the light source is adjusted based on a motion state of the asset. The image sensor is configured to capture a response of the retroreflective material to the incident non-visible light. Furthermore, the response of the retroreflective material that is collected by the image sensor is subsequently processed. The processor in one example is integrated with the image sensor while in another example the image sensor data is communicated to the processor. The processor is configured to process the response of the retroreflective material to decode the identity information of the asset. The foregoing is described in greater detail herein along with the accompanied drawings.

Figure 1:
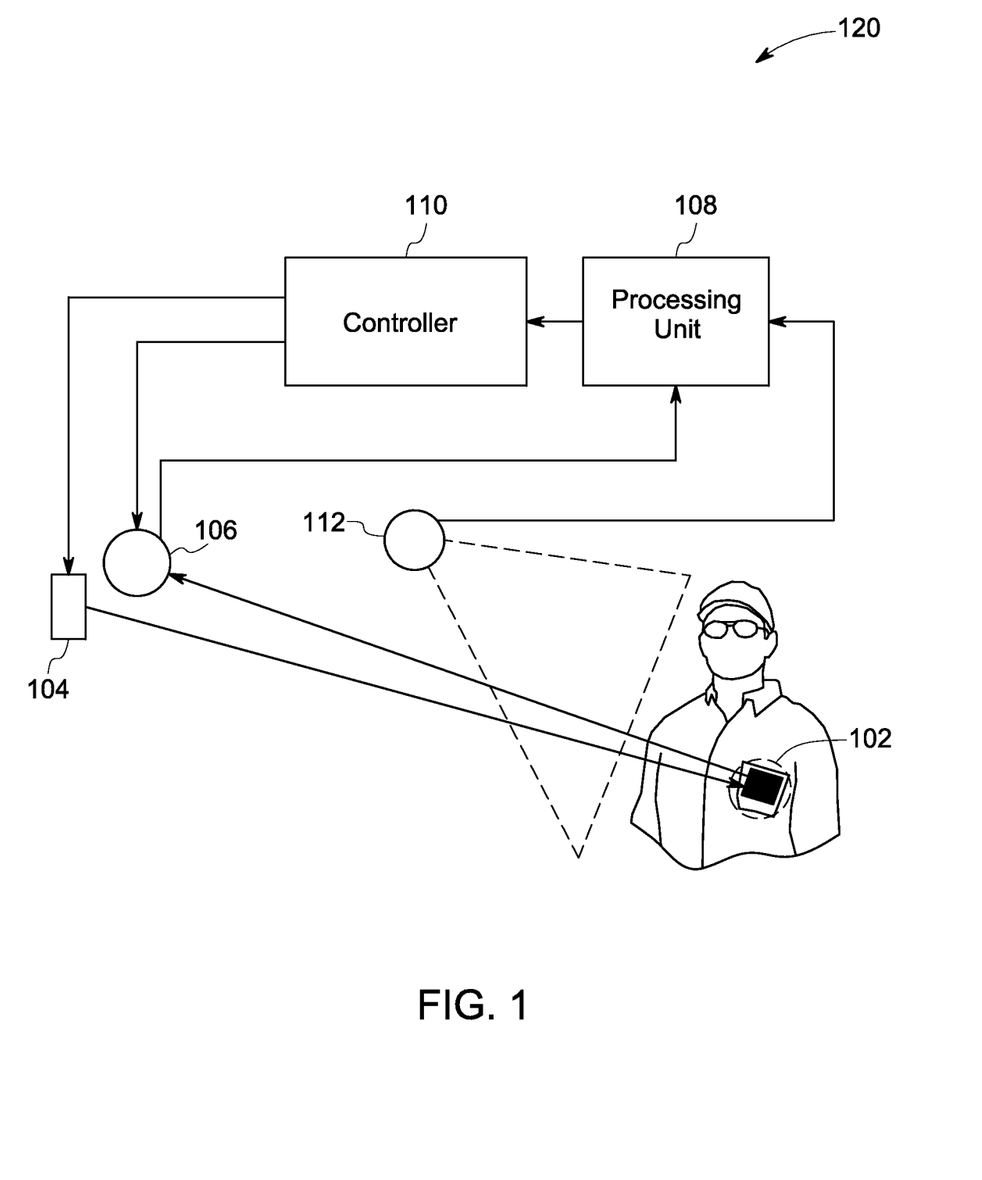
FIG. 1 illustrates a block diagram of a system for identification of an asset.

FIG. 1 illustrates a system 120 for identifying assets according to one embodiment. The system includes an identification pattern 102 associated with an asset. Examples of assets include, but are not limited to, human resources, machines, electronic devices, instruments, computers, and vehicles. In the exemplary illustration, the identification pattern 102 is associated with a human asset. The identification pattern 102 has identity information of the asset encoded through retroreflective materials. Retroreflective materials reflect incident light in the same traversal direction as that of the incident light. The identification pattern 102 will be explained in greater detail in conjunction with FIG. 2. The identification pattern 102, in certain embodiments, is disposed on an identification tag associated with the asset. Examples of identification tags include, but are not limited to, identity cards carried by employees, and identifiers attached with assets. The encoded identity information in the identification pattern 102 in this example includes a bar code, a quick response (QR) code, or other forms of visual identity patterns.

The system further includes, a light source 104 configured to emit non-visible light. Examples of the light source 104, includes, but is not limited to, an LED, or other type of light source capable of providing electromagnetic radiation having wavelengths in the non-visible spectrum (approximately wavelengths less than 430 nm or greater than 690 nm). Such radiation includes, but is not limited to, ultraviolet (UV) or infrared radiation (IR). The light source 104 in this example is disposed at a defined orientation angle at a location in the organization. The light source 104 can be configured to automatically emit non-visible light at pre-defined time intervals. In other embodiments, an operator, sensor based system or automated program may transmit activation signals to the light source 104. For example, an operator may transmit activation signals based on whether any of the assets with the organization is expected to be present in the location where the light source 104 is installed.

When the asset with the identification pattern 102 approaches the illumination range of the light source 104, the light source 104 emits non-visible light on the identification pattern 102. The retroreflective material on the identification pattern 102 reflects the incident non-visible light in approximately the same direction as the incident light.

Furthermore, the system 120 includes an image sensor 106 that is configured to collect a response, to the incident light, of the retroreflective material on the identification pattern 102. Examples of the image sensor 106 include, but are not limited to, standard charge coupled device (CCD) or complementary metal oxide semiconductor (CMOS) imaging sensors. The image sensor 106 is disposed at a location desirable to collect responses of the retroreflective material to the incident light. In certain embodiments, the light source 104 and the image sensor 106 are disposed at a predetermined orientation angle. In some embodiments, the image sensor 106, and the light source 104 are disposed proximate to each other. The spectral sensitivity of the image sensor 106 is adjusted to the wavelength of the non-visible light emitted by the light source 104 to ensure that the image sensor 106 captures responses from the retroreflective material to the incident non-visible light while ignoring the response of the retroreflective material to the ambient light of a wavelength different from that of the non-visible light. In one embodiment the light source 104 and the image sensor 106 are configured to rotate or otherwise change the orientation angle. The light source 104 and the image sensor 106 may be coupled, independently or together, to a servo and gimbal mount that allows for such rotation. The servo in one example can be automated and/or respond to communication instructions.

The system 120 also includes at least one processor 108 configured to adjust one or both of a shutter speed of the image sensor 106, or power supplied to the light source 104. The processor 108, in certain embodiments, may comprise a central processing unit (CPU) such as a microprocessor, or may comprise any suitable number of application specific integrated circuits (ASICs). The processor 108 may include memory. The memory can be an electronic, a magnetic, an optical, an electromagnetic, or an infrared system, apparatus, or device. Common forms of memory include CD-ROMs, hard disks, magnetic tape, flash memory, Random Access Memory (RAM), a Programmable Read Only Memory (PROM), and Electronically Erasable Programmable Read Only Memory (EEPROM), and a portable compact disc read-only memory (CDROM). The processor 108 is capable of executing program instructions, such as generating control commands to control the shutter speed of the image sensor 106, and/or the power supplied to the light source 104, and functioning in response to those instructions or other activities that may occur in the course of identifying the asset. Such program instructions typically comprise a listing of executable instructions for implementing logical functions. The listing can be embodied in any computer-readable medium for use by or in connection with a computer-based system that can retrieve, process, and execute the instructions. Alternatively, some or all of the processing may be performed remotely by additional processors 108. Furthermore, the processor can also receive user input instructions to perform certain functions or modify instructions.

In one example, the processor 108 generates control commands to control the shutter speed, the power supplied to the light source, or both, based on the motion state of the asset. With the movement of the asset, the identification pattern 102 also experiences movement. The movement experienced by the identification pattern may be linear in the direction of the movement of the asset. The identification pattern 102 may also experience oscillating and/or rotational movement during the movement of the asset. The processor 108 generates control commands in coordination with the motion state of the asset and a degree of movement of the identification pattern 102. For example, when the asset is moving at a fast rate, the processor 108 generates control commands pertaining to one or both of increasing the shutter speed of the image sensor 106, or increasing the power supplied to the light source 104. On the other hand, when the asset is moving at a slow rate the control commands pertain to one or both of reduction in the shutter speed of the image sensor 106 or decrement in the power supplied to the light source 104. The shutter speed of the image sensor 106 and the power supplied to the light source 104 are controlled to ensure the responses captured by the image sensor 106 are not blurred.

In another example, the rotation or oscillation of the identification pattern 102 such that the reflected light from the light source would not be within the field of view of the image sensor 106. The system in one example would delay transmission form the light source until the identification pattern 102 is in a proper orientation. In another example, the light source 104 and/or the image sensor 106 would alter its angle such that the reflection from the identification pattern 102 could be processed. In a further example, there can be more that a single light source and more than a single image sensor such that the other light sources and image sensors would obtain the desired reflection.

The motion state of the asset in one example is determined based on the images captured by a second image sensor 112. The motion state of the asset is used to calculate the speed of movement of the asset. The second image sensor 112 is disposed to track movement of the asset from one point in the line of sight of the second image sensor 112 to another point in the line of sight of the second image sensor 112. The second image sensor 112 is configured to capture images of the asset. In some embodiments, motion state of the asset is determined from the images captured by the second image sensor 112 through known techniques of speed detection such as ones used to detect speed of motion of moving vehicles by vehicle interceptors. In other embodiments, the motion state of the asset can be determined using the methodology and system disclosed in commonly assigned patent application Ser. No. 13/456,399.

The processor 108 is configured to transmit the control commands, generated based on the motion state of the asset, to a controller 110. The controller 110 is electrically coupled with the image sensor 106 and the light source 104. The controller 110, based on the control commands, controls the shutter speed of the image sensor 106, and the power supplied to the light source 104 to capture noiseless response from the retroreflective material on the identification pattern 102.

The processor 108 is further configured to process the response received by the image sensor 106 to decode the identity information of the asset. The image sensor 106 is communicably coupled with the processor 108 such as through a communication channel. The communication channel between the image sensor 106 and the processor 108 includes, but is not limited to, coaxial cables, fiber optic cables, Bluetooth™, Wi-Fi™, WiMAX®, General Packet for Radio Service (GPRS), Global System for Communications (GSM), Near Field communication channels, Radio Frequency Identification (RFID) communication channels, and personal area network communication channels such as Zigbee®.

Figure 3:
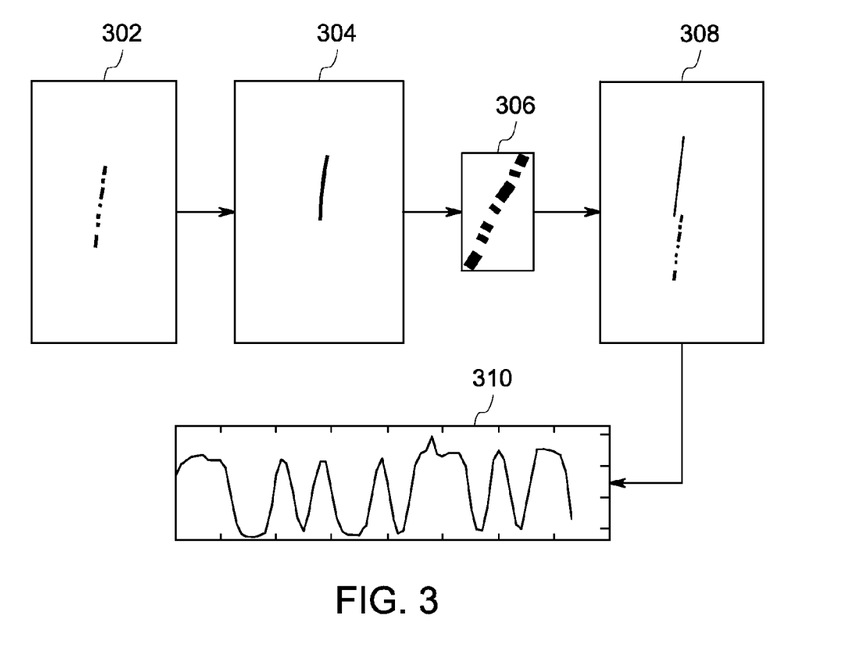
FIG. 3 illustrates a series of results from processing the response received from the identification pattern.

The processes involved in processing of the response received by the processor 108 from the image sensor 106 have been described in greater detail in conjunction with FIG. 3. During post processing, the processor 108 matches the decoded information with information stored in the asset repository of the organization and authenticates the presence of the asset in the vicinity of the image sensor 106. The processor 108 may be configured to communicate with an operator through various communication means such as mobile, text messages, or an alert through an operator dashboard, if the decoded identity information belongs to an asset that is not authorized access to the location.

According to one embodiment, the processor 108 utilizes a plurality of images of the asset that are captured by the first image sensor 106 or the second image sensor 112, or both for tag identification. The processor 108 is configured to temporally filter the response captured by the first image sensor 106 to identify the identification pattern 102 across more than one image from the plurality of images captured by the image sensors 106 or 112. Known algorithms such as majority voting algorithm, or filtering algorithm like Kalman filtering algorithm can be used by the processor 108 to correlate identifications patterns 102 observed in the plurality of images of the asset. Based on a processing of the identification patterns 102 observed in the plurality of images, the processor 108 determines the identity of the asset.

The processor 108, while processing, may encounter more than one encoded identity information in the response collected from the retroreflective material. The system for identifying assets, in certain embodiments, may include a data repository to store information pertaining to past identity information determination for assets in the organization. The processor 108 uses the information stored in the data repository to determine one of the more than one identity information that corresponds with the asset.

Figure 2:
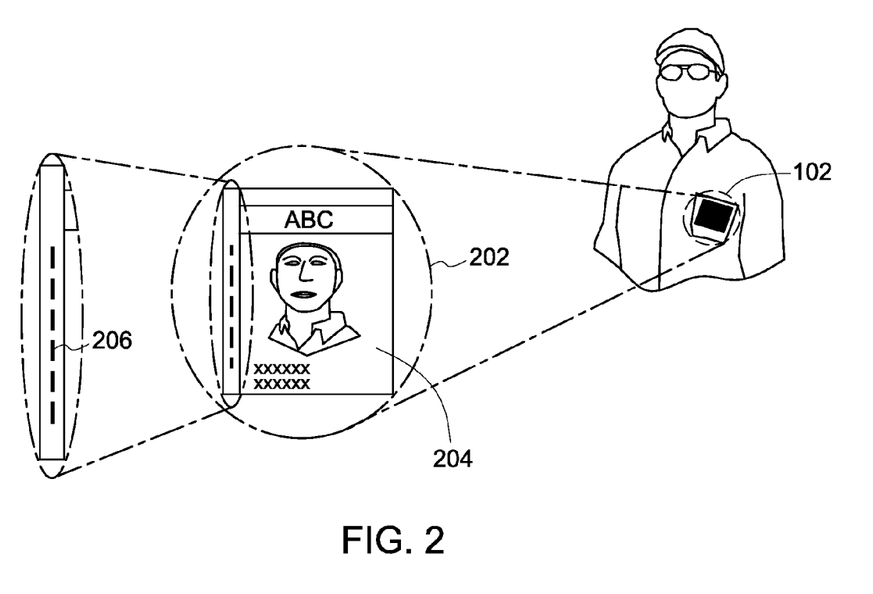
FIG. 2 illustrates an exemplary embodiment of an identification pattern on an identification tag of the asset.

FIG. 2 illustrates an exemplary embodiment of the identification pattern 102 on an identification tag of the asset. The identification pattern 102, according to some embodiments, is disposed on an identification tag associated with the asset. Examples of identification tags include, but are not limited to, identity cards carried by employees, and identifiers attached with physical asset. In the illustrated embodiment, the identification pattern 102 is disposed on an identification tag 202. In one embodiment, to manufacture the identification tag 202 with the identification pattern 102, and retroreflective material is deposited on infrared blocking material. In another embodiment, a narrow strip of retroreflective material is placed on an identification tag. Light blocking material 204 is disposed on the narrow strip of the retroreflective material to form a visual code that encodes the identity information of the asset. The light blocking material 204, as illustrated in FIG. 2, is disposed to form a bar-code representation of the identity information of the asset. The light blocking material 204 includes, but is not limited to, ink, dye, toner, or pigment. The light blocking material 204 is cut in predetermined shapes and pasted on the retroreflective strip that is attached to the identification tag 202 of the asset.

In some embodiments, the retroreflective material is obtained with pre-printed identity information codes. The retroreflective material is then pasted on to the identification tag of the asset with the help of adhesives.

FIG. 3 illustrates a series of results obtained from the processor 108 based on the response received from the reflection signal of the identification pattern 102. When the processor 108 receives the response from the image sensor 106 based on the retroreflective material from the identification pattern 102, the processor 108 processes the images to decode the identity information stored in the identification pattern 102. From the image obtained through the image sensor 106, the processor 108 obtains a binary image 302. The binary image 302 of the reflected response from the retroreflective material is an image representation of the response that has only two possible values for each pixel. According to certain embodiments, the processor 108 utilizes a predetermined pixel value threshold for binarization of the response image obtained from the retroreflective material. In some embodiments, pixels with values greater than that of the predetermined pixel value threshold are classified as white, while the rest are classified as black. According to certain embodiments, an adaptive algorithm can be used to decide on the threshold to be used for image binarization. In the adaptive algorithm, based on values of pixels encountered by the processor 108 while processing the image response from the retroreflective material, the value of the threshold is so adjusted that the pixels holding values from the retroreflective material fall are either above or below the threshold. In some embodiments, the threshold is calculated using the following equation:

$$\text{Threshold} = \text{mean}(img) + 6 * \text{stddev}(img)$$

Where, img is a value of all pixels in the response received by the processor 108.

Further, the binary image 302 is filtered to reduce the noise in the binary image 302 and obtain a cleaned image 304. In certain embodiments, the noise in the binary image 302 is removed by performing a morphological closing operation. In morphological closing operations, in an image, a background pixel that is in contact with a pixel of interest is changed to being a pixel of interest. For example, in the binary image 302 if white pixels include the identity information of the asset, the black pixels touching the white pixels are converted to black pixels. Further, in the closing operation, the pixels that are touching the background pixels are converted to background pixels. This operation reduces the noise in the binary image 302 and provides the processor 108 with cleaned image 304. In some embodiments, the cleaned image 304 is obtained by the processor 108 by applying a disc mask of pixel radius 15 to the binary image 302.

Further, during processing, the processor 108 is configured to label connected components in the cleaned binary image 304. The connected components in the cleaned binary image 304 are found by building a graph or a vector of the cleaned binary image 304. While determining the connected components, the processor 108 may determine 4-connected pixels, 6-connected pixels, or 8-connected pixels. In the illustrated embodiment, item 306 shows 8-connected pixels from the cleaned binary image 304. The processor 108, according to certain embodiments, uses known algorithms such as one-pass connected component detection algorithm, two-pass algorithm, or sequential algorithm, or combinations of these known algorithms to detect connected components 306 from the cleaned binary image 304. Each connected component 306 from the cleaned binary image 304 may correspond to identity information pertaining to the asset to which the identification pattern 102 is attached.

Post determination of the connected components 306 in the cleaned binary image 304 of the response collected from the retroreflective material on the identification pattern 102, the processor 108 is configured to extract scan-lines of the identity information that is encoded in the identification pattern 102. To extract scan-lines of the identity information, for example a bar-code, the processor 108 performs a weighted principle component analysis of all pixels of the connected components 306. In the weighted principle component analysis, each pixel in the connected component 306 is weighted by the value of that pixel. A scan line, as illustrated by item 308, is generated based on the weighted analysis of each pixel. Each weighted pixel is then compared with a first principle component of the principle component analysis of the cleaned binary image 304. A histogram, item 310, is generated based on the comparison of the weighted pixels of the cleaned binary image 304 with the first principle component. From the histogram 310, the identity information is decoded by the processor 108 through a process of searching a set of threshold values around every point in the histogram. For example, in the histogram 310, the processor 108 starts at the mean of the histogram profile and searches for points on the histogram which fall within the set of threshold values. A starting bit and an ending bit of pixel values is used to determine the start and end of the identity information from the histogram 310. Based on presence of connected bits of pixel values between the starting bit and ending bit, a value corresponding to the connected bits of pixel values is determined. The value, in certain embodiments, can be the identity information of the asset. For example, in case a barcode is used as identity information in the identification pattern 102, the values of the connected pixel values from the histogram 310 are checked to see if they correspond to a valid length of a barcode. Further, the starting and ending bits of the connected pixel values are checked to determine if they correspond to a valid barcode. If the start and end bits match to a valid barcode, the determined connected pixel values are identified as the identity of the asset with which the identification pattern 102 is attached.

In certain embodiments, the processor 108 is also configured to remove motion effects from the images captured by the second image sensor 112. Images captured by the image sensors 106 and 112 are used to determine the motion state of the asset. Based on the motion state of the asset, a series of images is generated that represents change in movement of the asset from a first image captured by either the first image sensor 106 or the second image sensor 112. The actual images captured by the image sensors 106 and 112 are compared with the series of images generated by the processor 108. The differences between the predicted series of images and the captured images are reduced by applying different image smoothing function such as gradient descent algorithms.

In certain embodiments, an error code may also be inserted in the identity information of the asset. The error code is checked by the processor 108 to determine the validity of the identity information being decoded.

Figure 4:
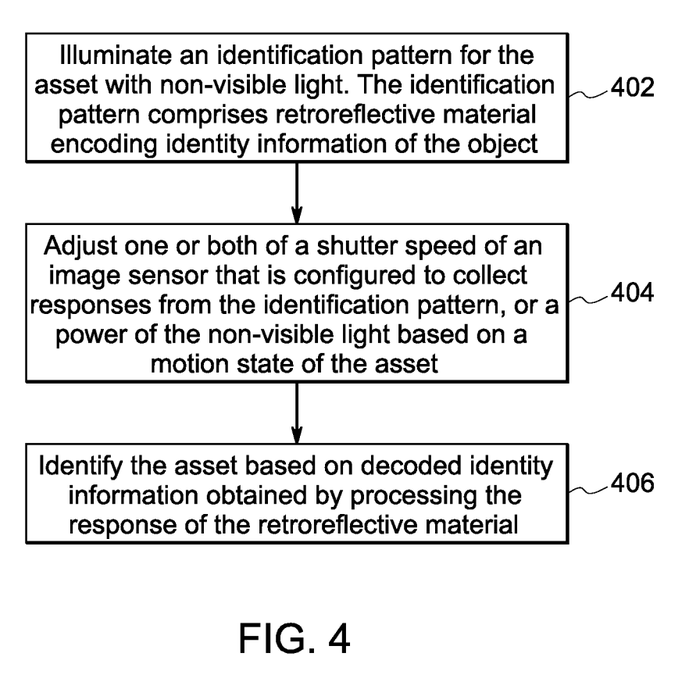
FIG. 4 illustrates a flow diagram of a method for identifying assets.

FIG. 4 illustrates a flow diagram of a method for identifying assets. At 402, the identification pattern 102 of the asset is illuminated with non-visible light. The identification pattern 102 that include retroreflective material reflects the incident non-visible light that is received by the image sensor 106. At 404, at least one or both of the shutter speed of the image sensor 106 or the power of the non-visible light are adjusted based on the motion state of the asset. At 406, the response received by the image sensor 106 is processed by the processor 108 to decode the identity information stored through the retroreflective material on the identification pattern 102.

In some embodiments, the motion state of the asset is varying and thus leads to a variance in the angle of incident of the non-visible light with respect to the identification pattern 102. The motion state of the asset, in certain embodiments, is utilized to calculate speed of movement of the asset through images of the asset captured by a second imaging sensor 112 located at fixed intervals in the vicinity of the image sensor 106.

From the response received by the image sensor 106, a binary image is obtained. The binary image is cleaned to clear noise that may be present in the binary image. From the cleaned binary image, connected components of pixels are determined and are used to decode the identity information of the asset. While processing the response, in certain embodiments, a portion of the response is selected for processing based on a determination of probably location of the identification pattern 102 on the asset. The probable location of the identification pattern 102 is determined based on the motion state of the asset. The motion state of the asset is utilized to determine the oscillations of the identification pattern 102. Based on the oscillations observed in the identification pattern 102, probable locations are determined and used to select the portion of the response for processing.

Various embodiments described above thus provide for a method and a system for identifying assets. The method and system for identifying assets provides for recognition of assets from a distance and thus eliminates the need of swiping or scanning identity cards for authorization. The system and method also work for indoor lighting conditions as the shutter speed and the power to the light source can be adjusted based on determination of ambient conditions. Further, the process of decoding identity information is also simplified and made efficient due to identification of probable locations of the identification pattern along the asset, and probable location of the identity information in the response collected from the retroreflective material.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their assets. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described method and system for identification of assets, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for identifying an asset, the method comprising:
    illuminating an identification pattern for the asset with non-visible light, wherein the identification pattern comprises retroreflective material encoding identity information of the asset;
    adjusting a shutter speed of an image sensor and a power of the non-visible light based on a motion state of the asset, wherein the motion state of the asset causes oscillating movement of the identification pattern, wherein the image sensor is configured to receive a response of the retroreflective material to the incident non-visible light;
    selecting at least a portion of the response for processing based on a determination of a probable location of the identification pattern on the asset, wherein the probable location of the identification pattern is detected based on the oscillating movement of the identification pattern; and
    identifying the asset based on decoded identity information, wherein the decoded identity information is obtained by processing the selected portion of the response of the retroreflective material.

2. The method as recited in claim 1, wherein the oscillating movement of the identification pattern causes an angle of incidence of the non-visible light with respect to the identification pattern to vary.

3. The method as recited in claim 1, further comprising determining the motion state of the asset through a second imaging sensor disposed to capture images of the asset.

4. The method as recited in claim 1 wherein processing the response further comprising:
    obtaining a binary image from the response received by the image sensor;
    labeling connected components of the binary image; and
    determine identity information from the labeled connected components of the binary image.

5. The method as recited in claim 1, further comprising forming the identification pattern by placing light blocking material over a substrate of the retroreflective material.

6. The method as recited in claim 1, further comprising disposing the image sensor proximate to a light source, wherein the light source is configured to emit the non-visible light.

7. The method as recited in claim 1, further comprising adjusting a spectral sensitivity of the image sensor to a wavelength of the non-visible light emitted by a light source.

8. The method as recited in claim 1, further comprising determining the identity information from a plurality of identity information determined from the response of the retroreflective material, wherein the identity information is determined based on historical information pertaining to the correlation of the asset with each of the plurality of identity information.

9. A system for identification of an asset, the system comprising:

an identification pattern for the asset comprising retroreflective material, wherein the identification pattern encodes identity information of the asset;

a light source for illuminating the identification pattern for the asset with non-visible light;

an image sensor disposed to receive a response of the identification pattern to the incident non-visible light; and a processor configured to:

generate control commands to control a shutter speed of the image sensor and a power supplied to the light source based on a motion state of the asset, wherein the motion state of the asset causes an oscillating movement of the identification pattern;

select at least a portion of the response based on a determination of a probable location of the identification pattern, wherein the probable location of the identification pattern is detected based on the oscillating movement of the identification pattern; and process the selected portion of the response of the identification pattern to decode the identity information of the asset.

10. The system as recited in claim 9, further comprises a controller configured to control one or both of the shutter speed of the image sensor, or the power supplied to the light source based on the control commands generated by the processor.

11. The system as recited in claim 10, further comprises a second image sensor to capture images of the asset in motion, wherein the motion state of the asset is varying.

12. The system as recited in claim 9, further comprises a controller configured to adjust an angle of incidence of the light source with respect to the identification pattern based on the oscillating movement of the identification pattern.

13. The system as recited in claim 9, further comprises light blocking material of predetermined shapes disposed on a substrate of the retroreflective material to form the identification pattern.

14. The system as recited in claim 9, wherein the processor is further configured to:

obtain a binary image from the response received by the image sensor;

label connected components of the binary image; and determine identity information from the labeled connected components of the binary image.

15. The system as recited in claim 9 further comprises a data repository to store information pertaining to past identity information determination for the asset.

16. A system for identification of at least one asset in a hospital, the system comprising:

an identification pattern for the asset comprising retroreflective material, wherein the identification pattern encodes identity information of the asset;

a light source for illuminating the identification pattern for the asset with non-visible light;

an image sensor disposed to receive a response of the identification pattern to the incident non-visible light; and a processor configured to:

generate control commands to control a shutter speed of the image sensor and a power supplied to the light source based on a motion state of the asset, wherein the motion state of the asset causes an oscillating movement of the identification pattern;

select at least a portion of the response based on a determination of a probable location of the identification pattern, wherein the probable location of the identification pattern is detected based on the oscillating movement of the identification pattern; and process the selected portion of the response of the identification pattern to decode the identity information of the asset.

17. The system as recited in claim 16, further comprises a second image sensor to capture images of the asset in motion.

18. The system as recited in claim 17, wherein the processor is configured to calculate the motion state of the asset based on image inputs provided by the second image sensor.

19. The system as recited in claim 16, further comprises a controller configured to control one or both of the shutter speed of the image sensor, or the power supplied to the light source based on the control commands generated by the processor.

20. The system as recited in claim 16, wherein the processor is further configured to:

obtain a binary image from the response received by the image sensor;

label connected components of the binary image; and determine identity information from the labeled connected components of the binary image.

21. The system as recited in claim 16 further comprises a data repository to store information pertaining to past identity information determination for the asset.

* * * * *